United States Patent
Fliermans

(10) Patent No.: US 8,236,196 B1
(45) Date of Patent: Aug. 7, 2012

(54) SYSTEMS AND METHODS FOR FACILITATING HYDROGEN STORAGE USING NATURALLY OCCURRING NANOSTRUCTURE ASSEMBLIES

(75) Inventor: Carl B. Fliermans, Augusta, GA (US)

(73) Assignee: Microbes Unlimited, LLC, Augusta, GA (US)

( * ) Notice: Subject to any disclaimer, the term of this patent is extended or adjusted under 35 U.S.C. 154(b) by 612 days.

(21) Appl. No.: 12/408,400

(22) Filed: Mar. 20, 2009

Related U.S. Application Data

(60) Provisional application No. 61/038,584, filed on Mar. 21, 2008.

(51) Int. Cl.
- *C01B 3/02* (2006.01)
- *B01J 20/14* (2006.01)
- *B01J 20/34* (2006.01)
- *H01M 8/06* (2006.01)

(52) U.S. Cl. ............ 252/188.25; 252/188.21; 423/248; 502/412; 502/407; 502/53; 502/350; 502/351; 502/353; 977/948; 977/773; 977/775; 977/776; 977/777; 977/779; 977/780; 429/416

(58) Field of Classification Search ............ 252/188.25, 252/188.21; 423/248, 648.1, 658.3; 502/412, 502/407, 53, 350, 351, 353; 977/948, 773, 977/775, 776, 777, 779, 780; 429/416
See application file for complete search history.

(56) References Cited

U.S. PATENT DOCUMENTS

| | | | | |
|---|---|---|---|---|
| 2,087,691 | A * | 7/1937 | Iazier | 568/807 |
| 4,249,654 | A * | 2/1981 | Helversen | 206/7 |
| 5,248,649 | A * | 9/1993 | Mosley, Jr. | 502/262 |
| 5,296,438 | A * | 3/1994 | Heung | 502/407 |
| 5,312,597 | A * | 5/1994 | Heung | 422/159 |
| 6,641,908 | B1 * | 11/2003 | Clough | 428/319.1 |
| 7,534,741 | B2 * | 5/2009 | Wu et al. | 502/300 |
| 7,655,137 | B2 * | 2/2010 | Zhou et al. | 208/134 |
| 2006/0280677 | A1 * | 12/2006 | Hagemeyer et al. | 423/648.1 |
| 2008/0166288 | A1 * | 7/2008 | Zhou et al. | 423/586 |
| 2012/0003146 | A1 * | 1/2012 | Fliermans | 423/648.1 |

OTHER PUBLICATIONS

UNOCIC, Raymond R., et al., "Anatase assemblies from algae: coupling biological self-assembly of 3-D nanoloarticle structures with synthetic reaction chemistry," Chem. Commun., (2004) pp. 796-797.*

* cited by examiner

*Primary Examiner* — Joseph D Anthony
(74) *Attorney, Agent, or Firm* — Sutherland Asbill & Brennan LLP

(57) ABSTRACT

Some or all of the needs above can be addressed by embodiments of the invention. According to embodiments of the invention, systems and methods for facilitating hydrogen storage using naturally occurring nanostructure assemblies can be implemented. In one embodiment, a method for storing hydrogen can be provided. The method can include providing diatoms comprising diatomaceous earth or diatoms from a predefined culture. In addition, the method can include heating the diatoms in a sealed environment in the presence of at least one of titanium, a transition metal, or a noble metal to provide a porous hydrogen storage medium. Furthermore, the method can include exposing the porous hydrogen storage medium to hydrogen. In addition, the method can include storing at least a portion of the hydrogen in the porous hydrogen storage medium.

12 Claims, 5 Drawing Sheets

SYSTEMS AND METHODS FOR FACILITATING HYDROGEN STORAGE USING NATURALLY OCCURRING NANOSTRUCTURE ASSEMBLIES

RELATED APPLICATION

This application claims priority to U.S. Ser. No. 61/038,584, entitled "Systems and Methods for Facilitating Hydrogen Storage Using Naturally Occurring Nanostructure Assemblies", filed Mar. 21, 2008, the contents of which are hereby incorporated by reference.

GOVERNMENT LICENSE RIGHTS

Inventions described herein or otherwise based on this patent application may fall under Cooperative Research and Development Agreement CR-07-002 between Microbes Unlimited, LLC, and Savannah River National Laboratory, operated for the United States Department of Energy under Prime Contract DE-AC09-96SR18500 by Washington Savannah River Company. The U.S. Government may retain certain License rights in this application.

FIELD OF THE INVENTION

The invention relates generally to hydrogen storage, and more particularly, to systems and methods for facilitating hydrogen storage using naturally occurring nanostructure assemblies.

BACKGROUND OF THE INVENTION

The dependency on limited sources of oil and other carbon-based energy resources may hinder future economic growth and security for many nations. To advance towards independent energy economies, nations are considering alternative energy sources such as hydrogen. Hydrogen offers a promising solution, but there is currently a lack of suitable carriers for hydrogen that have a relatively high-energy density and low cost for vehicle storage application. Transport and an onboard vehicular storage of hydrogen ($H_2$) is a well-known bottleneck and one limiting factor in developing a hydrogen-based economy. The current lack of convenient, safe and cost effective materials and methods to store hydrogen has limited the widespread use of hydrogen as a fuel and as a mode for energy storage.

Guideline objectives published by the United States Department of Energy (USDOE) for hydrogen storage capacity for vehicle transportation have not yet been met by conventional technologies because of various size, recharge kinetics, cost and/or safety issues. One example of such conventional technologies includes the use of nanoporous metal-organic frameworks (MOFs) that enhance the adsorption of supercritical $H_2$. This appears to be accomplished by overlapping the charged potential fields from both sides of the pore structure to enhance the interaction potential. Another example of such conventional technologies includes the use of titanium alloys as hydrogen storage solids. However, neither of these conventional technologies has proven production practical for hydrogen storage with respect to meeting or exceeding the USDOE guideline objectives.

Other attempts to achieve suitable hydrogen storage capacities involve laboratory prepared nanomaterials and composite materials. One attempt includes the use of ethylene gas to prepare carbon nanofibers having widths that vary from about 2.5 nm (nanometers) to about 1 micron and lengths from about 5 to about 100 microns, however, the reproduction of these laboratory prepared nanomaterials was not adequately controllable. The expense of creating such materials can be thousands of dollars per gram of material. Another drawback to using such conventional nanomaterials has been the difficulty in controlling their synthesis while preserving the nanoscale integrity of the subsequent assembly. Laboratory prepared materials have provided hydrogen storage capacities at near ambient conditions. However, such conventional composite materials are sometimes plagued by a lack of reproducibility and can be very expensive for larger-scale production.

Therefore, a need exists for systems and methods for facilitating hydrogen storage using naturally occurring nanostructure assemblies.

SUMMARY OF THE INVENTION

Some or all of the needs above can be addressed by various embodiments of the invention. Various embodiments of the invention can provide systems and methods for facilitating hydrogen storage using naturally occurring nanostructure assemblies.

One embodiment of the invention includes selecting and modifying certain microorganisms called diatoms which contain naturally occurring nanostructure assemblies. These nanostructure assemblies, both modified and nonmodified, can mimic the original diatom structure but with capabilities of storing hydrogen in the naturally occurring nanostructures. This type of storage structure may be inherently safe and could provide relatively high-energy density storage for hydrogen. In this manner, hydrogen may be stored and ultimately used as a fuel for vehicles, other energy consuming systems, fuel cells for electrical consuming systems, and the portable transport of energy.

Various embodiments of the invention can include, or could otherwise facilitate, safely storing hydrogen in recyclable and exchangeable canisters containing diatoms or naturally occurring nanostructure assemblies. These diatoms or nanostructure assemblies can include nanostructures that can provide a renewable structure for hydrogen storage under near ambient temperatures and pressures. Hydrogen bound on such diatoms or naturally occurring nanostructure assemblies can be provided in a canister form where vehicle "fill-ups" would comprise exchanging pre-filled hydrogen canisters. Additionally, this embodiment may be used to facilitate mobile energy sources for electrical supply.

In one embodiment, a method for storing hydrogen can be provided. The method can include providing diatoms comprising diatomaceous earth or diatoms from a predefined culture. In addition, the method can include heating the diatoms in a sealed environment in the presence of at least one of titanium, a transition metal, or a noble metal to provide a porous hydrogen storage medium. Furthermore, the method can include exposing the porous hydrogen storage medium to hydrogen. In addition, the method can include storing at least a portion of the hydrogen in the porous hydrogen storage medium.

In another embodiment, a system for storing hydrogen can be provided. The system can include a hydrogen source and a sealed environment. The sealed environment can be operable to receive at least one substrate comprising a plurality of diatoms arranged in a nanostructure assembly, and a plurality of at least one of titanium, a transition metal, or a noble metal within the nanostructure assembly. The system can also include an environmental control system operable to control the pressure or temperature within the sealed environment, wherein the at least one substrate stores hydrogen upon simultaneous heating of the substrate and exposure of the substrate to hydrogen.

In another embodiment, an apparatus for storing hydrogen can be provided. The apparatus can include a substrate. The substrate can include a plurality of diatoms arranged in a nanostructure assembly. In addition, the substrate can include a plurality of at least one of titanium, a transition metal, or a noble metal within the nanostructure assembly, wherein at least one substrate stores hydrogen upon simultaneous heating of the substrate and exposure of the substrate to hydrogen.

In at least one aspect of an embodiment, hydrogen can be stored for certain durations of time without increased temperature, increased pressure, or a combination of each variable of temperature and pressure.

Other systems, processes, devices, and apparatus according to various embodiments of the invention will become apparent with respect to the remainder of this document.

BRIEF DESCRIPTION OF DRAWINGS

Figure 1:
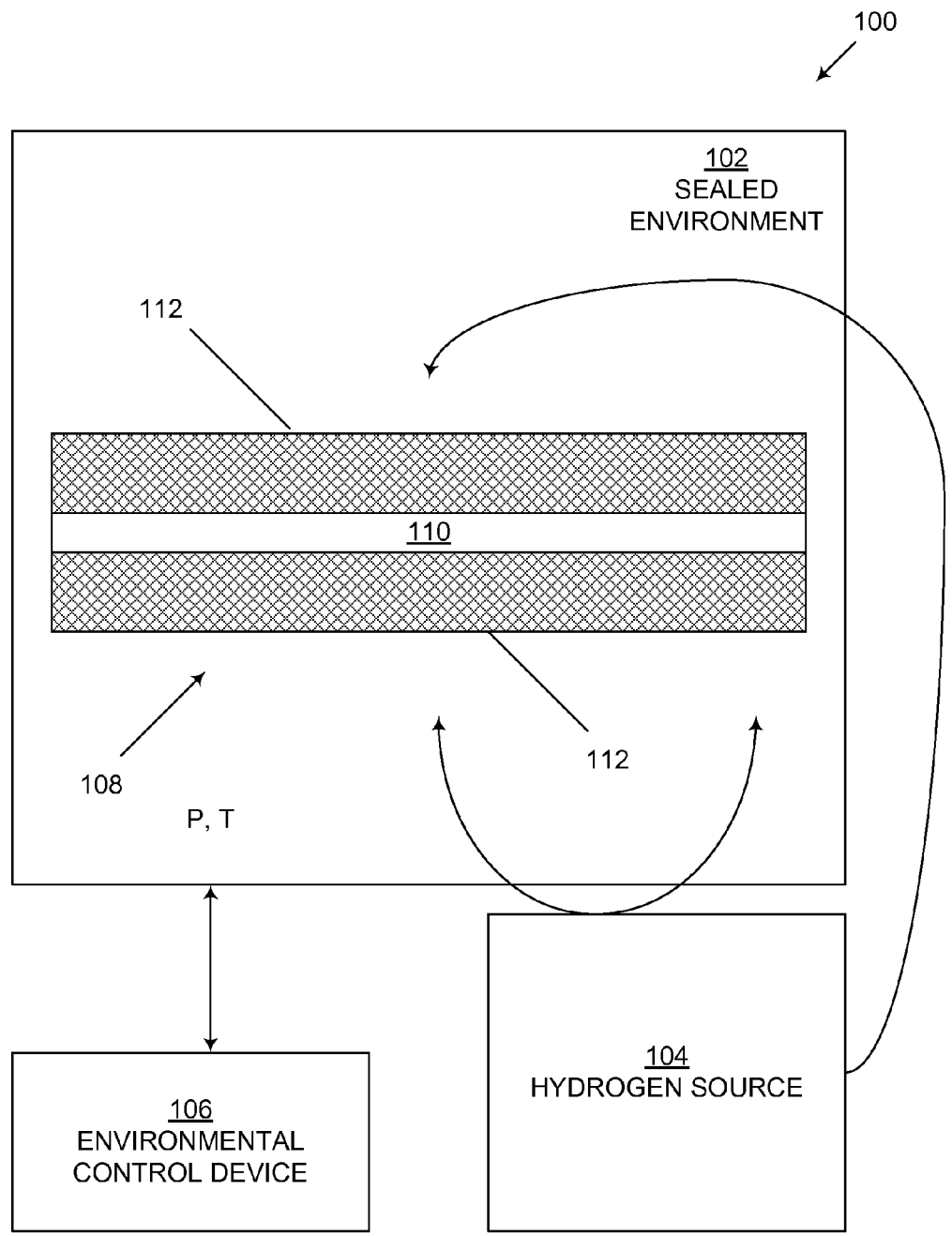

Having thus described various embodiments of the invention in general terms, reference will now be made to the accompanying drawings, which are not necessarily drawn to scale, and wherein:

FIG. 1 is an example system in accordance with one embodiment of the invention.

Figure 2:
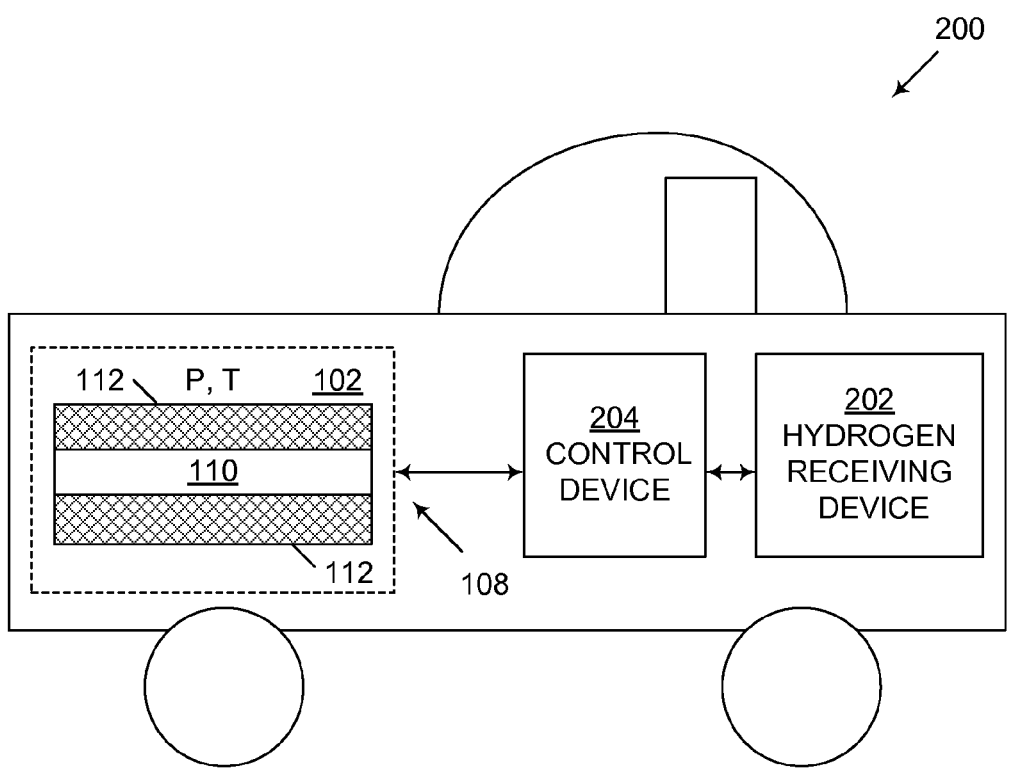

FIG. 2 is an example apparatus in accordance with an embodiment of the invention.

Figure 3:
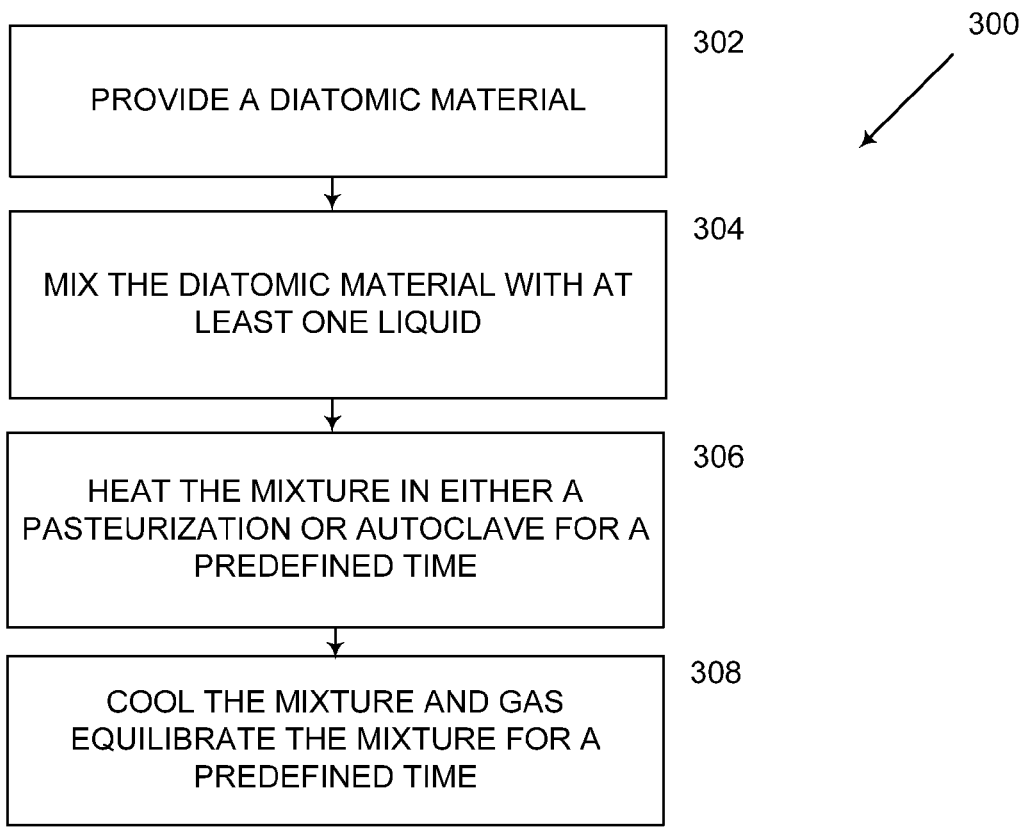

FIG. 3 is a flowchart of an example process in accordance with an embodiment of the invention.

Figure 4:
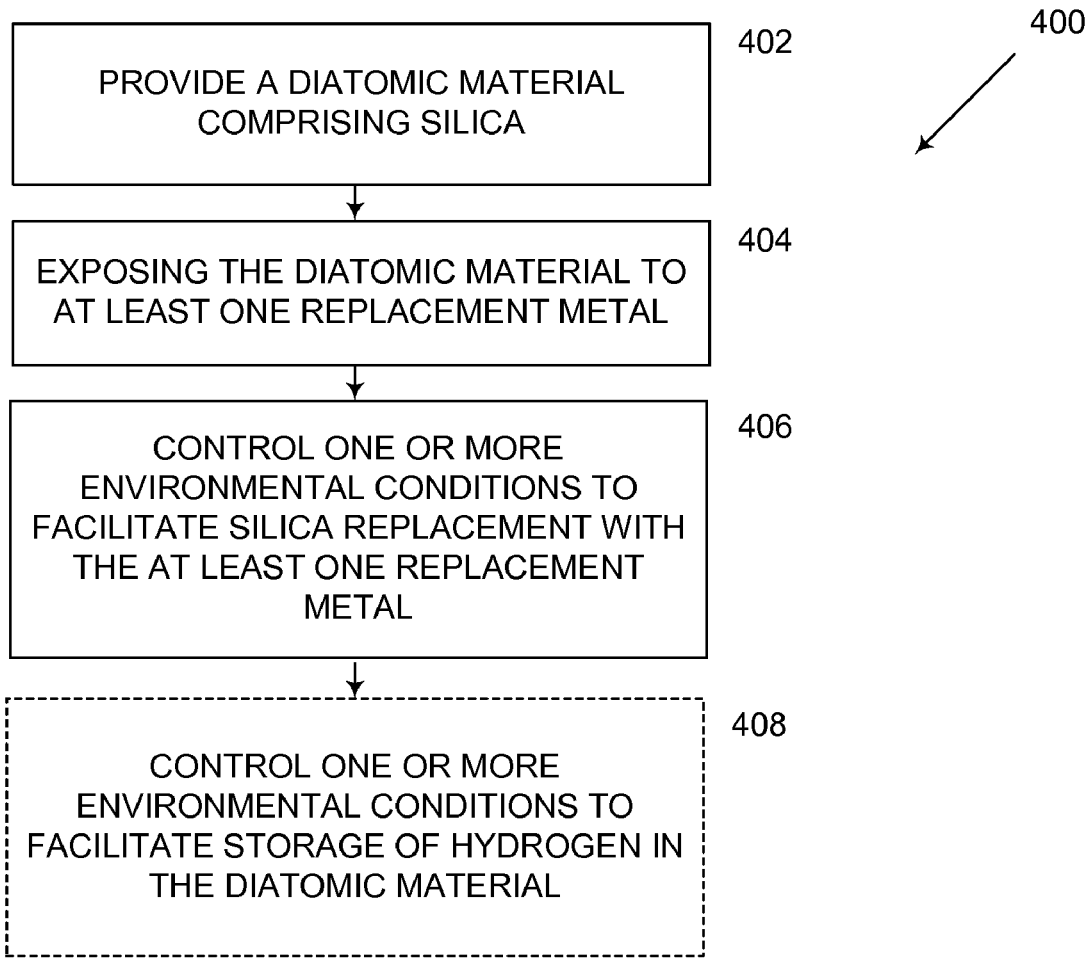

FIG. 4 is a flowchart of an example process in accordance with an embodiment of the invention.

Figure 5:
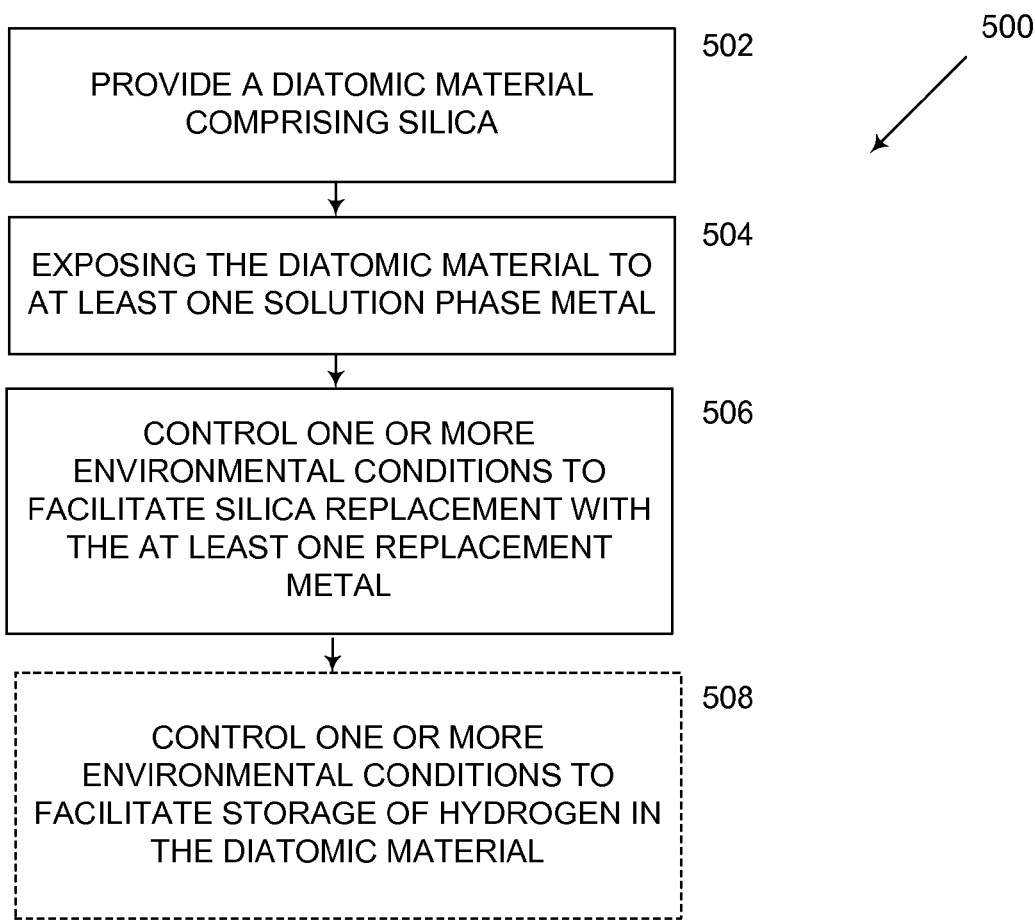

FIG. 5 is a flowchart of an example process in accordance with an embodiment of the invention.

DETAILED DESCRIPTION OF EMBODIMENTS OF THE INVENTION

Various embodiments of the invention now will be described more fully hereinafter with reference to the accompanying drawings. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

Various embodiments of the invention can provide systems and methods for facilitating hydrogen storage using naturally occurring nanostructure assemblies. In certain embodiments, particular nanostructures can be selected for hydrogen storage. In other embodiments, particular nanostructures can be prepared for hydrogen storage. In yet additional embodiments, processes and apparatus associated with particular nanostructures can facilitate hydrogen placement, storage, and replacement.

The terms "nanostructure", "diatom nanostructure", "nanostructure assembly", "diatom nanostructure assembly", and their pluralized forms can be used interchangeably herein, and are intended to mean the internal structure or pores of a diatom.

An example system according to one embodiment of the invention is illustrated in FIG. 1. The system 100 shown in FIG. 1, also known as a diatomic hydrogen storage system, can include a sealed environment 102, at least one hydrogen source 104, and at least one environmental control device 106. One suitable sealed environment can be a pressure vessel or similar substantially airtight environment. The sealed environment 102 is generally suitable to contain an apparatus 108, also known as a diatomic hydrogen storage apparatus, in accordance with an embodiment of the invention. In this embodiment, and as further described below, the apparatus 108 can comprise at least one substrate 110 with diatomic material and a nanostructure assembly 112. Generally, the nanostructure assembly 112 is capable of capturing and storing a predefined quantity of hydrogen. In certain embodiments, the nanostructure assembly 112 can be chemically and/or physically altered to capture and store additional quantities of hydrogen. In any instance, when the substrate 110 is exposed to hydrogen from a hydrogen source 104, the nanostructure assembly 112 can capture and store some or all of the hydrogen.

To facilitate the hydrogen storage capacity of the nanostructure assembly 112, the system 100 can be exposed to certain predefined conditions, such as a range of pressures P and temperatures T, during the exposure of the nanostructure assembly 112 to the hydrogen source 104. In the embodiment shown, an environmental control system 106 can modify the environmental conditions within the sealed environment 102 based in part on the initial startup conditions of the system 100, conditions during hydrogen storage, conditions after hydrogen storage, or any combination thereof. The environmental control system 106 can include various heating and/or pressure control components including, but not limited to, an external heating source, a pressurization or vacuum generation device, any number of pressure and/or temperature sensors, a feedback control device, a timer, or any combination thereof. In certain embodiments, the environmental control system 106 can facilitate increasing or decreasing the amount of excess hydrogen within the sealed environment 102 after storage or release of hydrogen from the nanostructure assembly 112.

In some embodiments, an environmental control device such as 106 can introduce one or more replacement or emplacement metals to the sealed environment 102. By selectively controlling one or more environmental conditions within the sealed environment 102, the replacement or emplacement metals can be apparatus 108 can either replace silica or fixate with silica in the substrate 110 and/or nanostructure assembly 112, thus improving the hydrogen storage capacity of the apparatus 108. In these environments, the environmental conditions can include, but are not limited to, pressure, temperature, solution concentration, and exposure time to replacement or emplacement metals.

In at least one embodiment, an environmental control device such as 106 is operable to release at least a portion of the stored hydrogen from the substrate 110 and/or nanostructure assembly 112. For example, the environmental control device such as 106 can selectively control one or more environmental conditions, such as pressure and temperature, to facilitate release some or all of the stored hydrogen from the substrate 110 and/or nanostructure assembly 112. As needed, an environmental control device such as 106 can be operable to re-expose the substrate 110 and/or nanostructure assembly 112 to hydrogen; and store at least a portion of the hydrogen in the substrate 110 and/or nanostructure assembly 112.

In at least one embodiment, hydrogen can be stored in an apparatus such as 108 and/or sealed environment such as 102 for certain durations of time without increased temperature, increased pressure, or a combination of each variable of temperature and pressure.

One will appreciate that components of the system 100 and apparatus 108 shown in and described with respect to FIG. 1 are provided by way of example only and is not shown to scale. Numerous other operating environments, system architectures, and system, device, or apparatus configurations are possible. Accordingly, embodiments of the invention should not be construed as being limited to any particular operating environment, system architecture, or system, device, or apparatus configuration.

After the apparatus 108 has stored a certain quantity of hydrogen, the apparatus 108 and/or sealed environment can be utilized in any number of industrial, commercial and/or research applications. As shown in FIG. 2, the apparatus 108 can be utilized as a hydrogen power source for a hydrogen-powered device 200 such as, but not limited to, a hydrogen-powered vehicle, a hydrogen-powered appliance, and a hydrogen-powered space. In such embodiments, the apparatus 108 may be contained within the sealed environment 102 as shown in FIG. 2, or in other embodiments, may not be contained within the sealed environment 102. In the embodiment of FIG. 2, the hydrogen-powered device 200 can include a hydrogen receiving device 202, which upon receipt of hydrogen can generate suitable power for operating the hydrogen-powered device 200, such as suitable power to drive certain components or functionality of the hydrogen-powered device 200. In certain embodiments, such as shown in FIG. 2, the hydrogen receiving device 202 can include a control device 204 to provide suitable conditions for extracting or otherwise releasing stored hydrogen from the apparatus 108. For example, the control device 204 can provide a suitable range of pressures and temperatures within the sealed environment 102 for releasing stored hydrogen from the apparatus 108.

In any instance, after some or all of the stored hydrogen has been extracted or released from the apparatus 108, the apparatus 108 can be "recharged" with additional hydrogen. In certain embodiments, the apparatus can be removed from the hydrogen-powered device 200, or in other embodiments, the apparatus can remain on board or otherwise mounted to the hydrogen-powered device 200. In any instance, the apparatus 108 can be maintained within a sealed environment such as 102, and at least one hydrogen source such as 104 in FIG. 1 can provide hydrogen to the apparatus 108 for capture and storage. In this manner, the apparatus 108 can be used and recharged multiple times for storing and releasing a supply of hydrogen for use in any number of industrial, commercial and/or research applications. In certain embodiments, the apparatus 108, or diatomic hydrogen storage apparatus, is capable of recycling hydrogen. That is, the apparatus can be charged with hydrogen, and discharged into a hydrogen accepting device such as an internal combustion engine or a fuel cell device.

One will appreciate that components of the system 200 and apparatus 108 shown in and described with respect to FIG. 2 are provided by way of example only and is not shown to scale. Numerous other operating environments, system architectures, and system, device, or apparatus configurations are possible. Accordingly, embodiments of the invention should not be construed as being limited to any particular operating environment, system architecture, or system, device, or apparatus configuration.

Selecting Suitable Nanostructure Assemblies for Hydrogen Storage

Various embodiments of the invention can utilize various naturally occurring nanostructures to facilitate hydrogen storage. The ability to control the synthesis and the assembly of particular nanostructures into suitable nanostructure assemblies is at least one factor in selecting for use certain structures for the storage of hydrogen. One example of a suitable nanostructure in accordance with an embodiment of the invention is the use of naturally occurring biological templates embodied in an alga called diatoms. Taxonomically classified within general alga, diatoms can be found in aquatic ecosystems and play a role in the regulation and cycling of silica in such environments while providing an abundant food source for aquatic animals. Generally, diatoms are naturally occurring and can be genetically controlled and replicated under certain defined conditions. As used herein, the term "naturally occurring" can be construed to distinguish from man-made devices or constructs, and refers to the initial creation of a particular device or construct by nature. For example, various embodiments of the invention can utilize diatoms and associated nanostructure assemblies which are naturally occurring, wherein such diatoms and nanostructure assemblies can subsequently be altered, modified, or otherwise changed to facilitate the storage of hydrogen. In any instance, regardless of whether the diatoms and nanostructures are ultimately altered, modified, or changed from their original natural state, such diatoms and nanostructures are referred to as naturally occurring.

Diatoms can also be found in diatomaceous earth, which is the geological deposit of fossilized silica shells of diatoms. Diatoms may be present naturally in geological diatomite deposits in the United States, including but not limited to regions in Oregon, Nevada, Washington, Florida, California, and New Jersey. Commercially available diatom material can be mined from such deposits, and may be available under the names DE, TSS, diatomite, diahydro, kieselguhr, kieselgur and/or Celite. One commercial source of diatom material is in Lompoc, Calif.

In at least one embodiment, one or more diatoms can be grown and cultivated in an aquiculture or microbiological environment, such as a predefined culture. Diatoms are generally unicellular photosynthetic algae with enormous diversity of patterns in their silica structures at the nano- to micron-scale. For example, one process for growing and cultivating suitable diatoms in accordance with an embodiment of the invention is as follows. Initially, a medium can be prepared on a tube-by-tube basis, using approximately 15 mL glass tubes, stoppered with rubber-lined screw caps. Next, a diatomic material, such as diatomaceous earth or soil containing *Bacillariophytes* or *Thalassiosira*, can be mixed with a liquid, such as distilled water and/or seawater. An example mixture or media can include about 1 cc of diatomaceous earth or soil (CR1 soil), about 12 ml of distilled water ($dH_2O$), and about 1 drop of pasteurized seawater.

Once the diatomaceous soil and liquid are mixed, the mixture or media is processed by pasteurization and/or autoclaving for up to 6 hours. For instance, an autoclaved mixture or media is processed for about 15 minutes, since transfer material typically contains organics and/or bacteria needed for algal growth. In a pasteurization process, tubes with a mixture or media can be brought to just under boiling temperature at about 98° C., and held at that temperature for about 2 hours. The tubes with the mixture or media are cooled to about room temperature for about 20-24 hours. Either of these processes can repeated for about three successive days. In certain embodiments, the mixture or media (pasteurized and/or autoclaved) be allowed to gas-equilibrate for about 2 days prior to use.

An example process for preparing diatoms in a culture is shown as 300 in FIG. 3.

The process 300 begins at block 302, in which a diatomic material is provided. For example, in the embodiment shown in FIG. 3, a suitable diatomic material to be provided can be *Bacillariophytes* or *Thalassiosira*.

Block 302 is followed by block 304, in which the diatomic material is mixed with at least one liquid. For example, in the embodiment shown, the liquid can be a mixture of distilled water and pasteurized seawater.

Block 304 is followed by block 306, in which the mixture is heated for a predefined time. For example, the mixture can be heated by a pasteurization and/or autoclaving process for up to 6 hours. For example, an autoclave process can process the mixture for about 15 minutes. In a pasteurization process, the mixture can be brought to just under boiling temperature at about 98° C., and held at that temperature for about 2 hours.

Block 306 can be followed by block 308, in which the mixture is cooled and gas equilibrated prior to use of the diatoms. For example, the mixture can be cooled to about room temperature for about 20-24 hours. In certain embodiments, either or both pasteurization and autoclaving processes can repeated for about three successive days. In certain other embodiments, the mixture can be gas-equilibrated for about 2 days prior to use.

The process 300 ends at block 308.

After selected diatoms are grown in culture to a desired density using the process 300 in FIG. 3, the diatoms can be harvested by centrifugation and processed by filtration as previously herein. The processed diatoms can then be used in a replacement process wherein the silica in the diatoms can be replaced by any number of metals, or in an emplacement process wherein any number of metals can be fixated to the silica in the diatoms. In either instance, the diatoms can be used in hydrogen storage according to certain embodiments of the invention described herein.

The example elements of FIG. 3 are shown by way of example, and other process embodiments can have fewer or greater numbers of elements, and such elements can be arranged in alternative configurations in accordance with other embodiments of the invention.

In this manner, diatoms can be a renewable resource when grown and cultivated in an aquiculture or microbiological environment, such as a predefined culture.

Particular examples of suitable diatoms which can be grown and cultivated in an aquiculture or microbiological environment, such as a predefined culture, are *Bacillariophytes* and *Thalassiosira*, though many other types and species of diatoms can be used in accordance with embodiments of the invention. In any instance, each suitable diatom can have various patterns of nanopores that provide for high surface to volume ratios. In one instance, each diatom of a specific genus may contain as many as about 2,500 nanostructures (areolae) within a frustule. Each areola within the frustule may contain approximately 8,000 $nm^3$ and $2.00 \times 10^7$ cubic nanometers for each diatom. Diatom cultures that contain about $10^6$ algae/ml can have a reactive surface area of approximately $2.00 \times 10^{13}$ cubic nanometers.

Various examples of suitable diatoms having reproducible structures that exist in relatively intricate 3-D mineralized constructs are shown in certain images of silica-based microshells (frustules) of various diatom species described by F. E. Round, R. M. Crawford, and D. G. Mann, "The Diatoms: Biology & Morphology of the Genera", University Press (1990).

In some instances, certain species of diatoms are genetically regulated to reproduce themselves in intricate frustule structures, which contain numerous regularly spaced and sized nanostructures. In other instances, diatoms may be cultivated under certain conditions that allow continuous and rapid replication, for instance, relatively large numbers of diatoms can be grown in culture. When diatoms replicate, they assemble into large biofilm structures and templates. In any instance, the synthesis and the assembly of one or more diatoms into suitable nanostructure assemblies can be facilitated.

Other suitable diatoms, diatomic materials, and nanostructure assemblies in accordance with embodiments of the invention can exist and will be apparent from the above.

Preparing Suitable Nanostructure Assemblies for Hydrogen Storage

Generally, selected diatoms can be prepared, modified, or otherwise processed to provide nanostructures or diatom assemblies capable of storing hydrogen in accordance with various embodiments of the invention. Suitable preparation processes in accordance with embodiments of the invention are described below. Some embodiments include the use of a diatom nanostructure without chemical or physical alterations. Other embodiments of the invention relate to modifying a diatom nanostructure with certain chemical and/or physical alterations to capture hydrogen. In any instance, certain preparations can be undertaken to prepare selected diatoms to provide suitable nanostructures or diatom assemblies operable to store and release hydrogen multiple times.

$SiO_2$ Replacement Process

One process in accordance with an embodiment of the invention involves the partial or substantially complete replacement of silicon (Si) with a metal, such as titanium (Ti), within the diatom structure. This embodiment results in a plurality of diatoms with catalytic-type nanostructures, wherein the original nanopore-type structure of some or all of the diatoms remains intact. These new nanostructures can retain a similar integrity and construct of the original diatom structures. Essentially, the process can result in chemical conversion of certain components within some or all of the silica atoms of the diatom frustule which results in nanostructures capable of capturing and storing hydrogen. In this manner, the nanostructures can mimic the original diatom structure but provide unexpected increased capacity to capture and store hydrogen by way of the available surface area and open 3-D pore configurations of the nanostructures. In other embodiments, diatom silica can be replaced by other materials capable of capturing and storing hydrogen, such as other transition metals and/or noble metals.

In this embodiment, the process can begin by obtaining suitable diatoms, such as commercially available diatomaceous earth containing numerous and diverse diatom species. In another embodiment, suitable diatoms can be replicated, for instance, by cultivating diatoms under certain defined conditions that allow continuous and rapid replication and an accumulation of diatom biomass. In any instance, suitable diatoms can be pre-assembled in frustral-type structures or other similar structures having nanostructure assemblies. The term "frustule" as used herein refers to the outer shell of the diatom which is made up of silica oxide.

The raw diatomaceous earth can be initially processed to remove any foreign material and to increase the concentration of diatoms within the processed or filtered material. The filtered material containing diatoms can be further processed to obtain diatoms of a predefined size. For example, a mill can be used to filter and grind suitable diatoms to a predefined size such as less than about 100 microns as separated by differential filtration. In another example, suitable diatoms can be processed by a continuous flow centrifugation device at about 7,000 rpm using distilled water and saline solutions at about 7.2 pH. After such processing, the diatom material can be concentrated by filtration and air dried to form a powder-type substance. Other milling, centrifugation, filtration, drying, or similar processing devices or techniques can be used in accordance with other embodiments of the invention.

In any instance, the processed diatoms can be introduced into a sealed atmosphere, for example, a sealed nitrogen or inert atmosphere. Within the sealed atmosphere and at elevated temperatures, at least one replacement metal can be added to the mixture. Under these conditions, the replacement metal can replace by substitution chemistry some or all of the silica within the diatoms. Example suitable replacement metals can include, but are not limited to, titanium, a transition metal, a noble metal, and any combination thereof. In other embodiments, combinations of metals can be added to the filtered and processed diatoms in a sealed atmosphere, and various replacement metals can replace some or all of the silica within the diatoms. In addition, various time, temperature, pressure ratios can be implemented to achieve varying replacement metal/silica replacement results.

In one embodiment, titanium tetrafluoride ($TiF_4$) can be added to filtered and/or milled diatoms within a sealed atmosphere inside of a titanium pressure vessel. The vessel can be heated to approximately 250 degrees Centigrade to initiate an exothermic reaction between the diatoms and titanium tetrafluoride, wherein the temperature increases to about 300 degrees Centigrade. After stabilization of the reaction and temperature, the vessel can be maintained at about 350 degrees Centigrade for about 2 hours and then cooled to room temperature. Upon cooling, oxygen or air is introduced to the vessel at about 300 cubic centimeters per minute for approximately 2 hours at about 350 degrees Centigrade to remove or otherwise sublime excess titanium tetrafluoride. In other embodiments, any number of environmental conditions within the sealed environment can be controlled including, but not limited to, pressure, temperature, excess moisture, and any combination thereof. In this manner, some or all of the titanium tetrafluoride can replace some or all of the silica within the diatoms. Once cooled to room temperature, the modified diatom nanostructure is suitable for hydrogen storage.

In another embodiment, titanium (Ti) metal powder can be added to filtered and/or milled diatoms within a sealed atmosphere. The mixture can be heated to approximately 600 degrees Centigrade for about 2 hours. In this manner, some or all of the titanium can replace some or all of the silica within the diatoms. That is, a reactive conversion of 3-D $SiO_2$ nanoparticle-based diatom frustules into nanocrystalline $TiO_2$ (anatase) via the use of a metathetic gas/silica displacement reaction can be implemented. The displacement structures can mimic the original diatom structural pattern including its nanopores but with the replacement of silica by titanium. Once cooled to room temperature, the modified diatom nanostructure is suitable for hydrogen storage. By using this embodiment of $SiO_2$ replacement, the replacement process can be carried out to replace substantially all, or only a portion, of the silicon with titanium. For example, from about 5% to about 100% of the silicon can be replaced with titanium, if so desired.

In another embodiment, a particular silicon replacement process described in Unocic, et al., "Anatase Assemblies from Algae: Coupling Biological Self-assembly of 3-D Nanoparticle Structures with Synthetic Reaction Chemistry", J. Chem. Soc., Chem. Comm., 2004[7], 795, be utilized to modify a diatom nanostructure suitable for hydrogen storage.

In accordance with other embodiments of the invention, the use of other metals than titanium, titanium tetrafluoride can be employed in the silica replacement process to prepare a suitable modified diatom nanostructure to store and release hydrogen. Thus, as shown in FIG. 4, an example process 400 for preparing a suitable diatomic nanostructure assembly, wherein silica is replaced in one or more diatoms is shown as process 400. The method 400 can be implemented by various system components shown in FIG. 1.

The process 400 begins at block 402, in which a diatomic material is provided. For example, in the embodiment shown in FIG. 4, a suitable diatomic material to be provided can be *Bacillariophytes* and *Thalassiosira*. Other suitable types of diatomic material can be utilized in accordance with embodiments of the invention.

Block 402 is followed by block 404, in which the diatomic material is exposed to at least one replacement metal. For example, in the embodiment shown in FIG. 4, suitable replacement metals can include, but are not limited to, titanium, a transition metal, a noble metal, and any combination thereof.

Block 404 is followed by block 406, in which one or more environmental conditions are controlled to facilitate silica replacement with the at least one replacement metal. For example, in the embodiment shown in FIG. 4, any number of environmental conditions within the sealed environment can be controlled including, but not limited to, pressure, temperature, excess moisture, and any combination thereof. In this manner, the replacement process can be carried out to replace some or substantially all of the silica with at least one replacement metal.

In one aspect of one embodiment, such as optional block 408, one or more environmental conditions are controlled to facilitate storing hydrogen in the diatomic material. For example, in the embodiment shown in FIG. 4, any number of environmental conditions within the sealed environment can be controlled including, but not limited to, pressure, temperature and any combination thereof. In this manner, a predefined quantity of hydrogen can be stored in the diatomic material.

The process 400 ends at block 408.

The example elements of FIG. 4 are shown by way of example, and other process embodiments can have fewer or greater numbers of elements, and such elements can be arranged in alternative configurations in accordance with other embodiments of the invention.

Solution Emplacement Pathway

In another embodiment, solution emplacement can be used to attach or otherwise fixate one or more metals to silica (Si) in the diatom nanostructure. Generally, solution emplacement can be implemented by the exposure of one or more solution phase metals to a selected substrate, followed by a fixation process, usually by heating. This process can cause the doping of one or more metals to the selected substrate. For example, one or more suitable noble metals, such as palladium (Pd), alkali metals, such as lithium (Li), and transition metals, such as iron (Fe), can be used to replace silica in a solution emplacement of one or more metals within a diatom nanostructure. In this manner, the pore structure of the diatoms can be filled with one or more reactive-type metals through a solution chemistry emplacement process. This process can minimize or otherwise prevent merely covering the surface of the diatom nanostructure or diatom assembly with one or more metals, which may diminish the overall hydrogen reactivity and storage capacity of the diatom nanostructure assembly. Instead, the process can provide greater metal coverage within the diatom nanostructure or diatom assembly to facilitate increased hydrogen storage by the diatom nanostructure.

At least two solution emplacement-type methodologies can be used in accordance with an embodiment of the invention. In one embodiment, relatively long diffusion pathways in the associated areolae structure of a diatom nanostructure or diatom assembly can be utilized. A soluble salt can be added to a solution mixture of the diatom nanostructure or diatom assembly, and allowed to equilibrate for a relatively long time period. The diatom nanostructure or diatom assembly can be separated from the soluble salt solution, washed, and in some instances, fixed by thermal treatment using deionized water. In other instances, remaining solution on the diatom nanostructure or diatom assembly can be removed by way of evaporation, which can be assisted by at least one methylene compound, such as methylene chloride, acetone, or other compounds with a relatively high vapor pressure. Because of the relatively long diffusion pathways within the areolae, the outer diatom nanostructure or diatom assembly surface can be washed of some or all metals without reducing metal concentrations within the areolae.

In another embodiment, one or more relatively large organic blocking molecules, such as polyethylene glycol (PEG), can be used to minimize or otherwise prevent outer surface fixation of metals to the diatom assembly. In some instances, suitable PEG can be purchased commercially in a wide range of molecular weights or sizes. The PEG weight or size can be varied to select an optimal size to permit suitable metal binding/sorption to the outer surface of the diatom assembly while allowing access of the soluble salt solution to the associated areolae structures of the diatom assembly.

In yet another embodiment, a solution emplacement process using colloidal-type metals can be implemented. In one example, an approach using a combination of silica beads and noble metals (e.g., Au, Pt/Pd, and mesoporous silica and quantum dots of ZnS/CdS) may be used. For the silica beads, a thiol functionalized polydimethyl siloxane (PDMS) surface reaction can be initiated, followed by reaction of small nanoparticles that selectively react at a selected site surface.

Thus, as shown in FIG. 5, an example process 500 for preparing a suitable diatomic nanostructure assembly, wherein at least one metal is fixated to silica in one or more diatoms is shown as process 500. The method 500 can be implemented by various system components shown in FIG. 1.

The process 500 begins at block 502, in which a diatomic material is provided. For example, in the embodiment shown in FIG. 5, a suitable diatomic material to be provided can be *Bacillariophytes* and *Thalassiosira*. Other suitable types of diatomic material can be utilized in accordance with embodiments of the invention.

Block 502 is followed by block 504, in which the diatomic material is exposed to at least one solution phase metal. For example, in the embodiment shown in FIG. 5, suitable solution phase metals can include, but are not limited to, noble metals, such as palladium (Pd), alkali metals, such as lithium (Li), and transition metals, such as iron (Fe), and any combination thereof.

Block 504 is followed by block 506, in which one or more environmental conditions are controlled to facilitate fixation of the at least one metal with the silica in the diatomic material. For example, in the embodiment shown in FIG. 5, any number of environmental conditions within the sealed environment can be controlled including, but not limited to, pressure, temperature, excess moisture, and any combination thereof. In this manner, the emplacement process can be carried out to fixate some or substantially all of the at least one metal to the silica in the diatomic material.

In one aspect of one embodiment, such as optional block 508, one or more environmental conditions are controlled to facilitate storing hydrogen in the diatomic material. For example, in the embodiment shown in FIG. 4, any number of environmental conditions within the sealed environment can be controlled including, but not limited to, pressure, temperature and any combination thereof. In this manner, a predefined quantity of hydrogen can be stored in the diatomic material.

The process 500 ends at block 508.

The example elements of FIG. 5 are shown by way of example, and other process embodiments can have fewer or greater numbers of elements, and such elements can be arranged in alternative configurations in accordance with other embodiments of the invention.

Hydrogen Placement, Storage, and Replacement

After a suitable nanostructure or diatom assembly has been prepared, for example, using any of the processes described herein such as in FIGS. 4 and 5, the nanostructure or diatom assembly can be exposed to hydrogen. In one embodiment, the nanostructure or diatom assembly can be exposed to hydrogen in certain predefined conditions to maximize hydrogen storage in the nanostructure or diatom assembly. Embodiments of the invention can include, but are not limited to, hydrogen exposure under ambient to relatively high pressures (about 8,000-10,000 psi) and/or under elevated to cryogenic temperature conditions (extremely cold temperatures). In this manner, hydrogen can be stored within the nanostructure or diatom assembly.

To release the hydrogen from the nanostructure or diatom assembly, certain temperatures and pressures can be implemented such that some or all of the hydrogen is released from, for instance, metal oxides, within the nanostructure or diatom assembly. In other embodiments, electrical, chemical, thermal, or other types of reactions may be utilized such that some or all of the hydrogen is released from, for instance, metal hydrides, within the nanostructure or diatom assembly.

Embodiments of the invention can include rechargeable nanostructures or diatom assemblies, which after at least one cycle of hydrogen placement and release, can be recharged to store and release hydrogen one or more additional times. In this manner, the nanostructure or diatom assemblies can be mounted to vehicles and other hydrogen use devices to provide a fuel or energy source, which can be recharged or renewed relatively quickly and easily.

In one example embodiment of the invention, a hydrogen storage module can be implemented with a hydrogen-powered vehicle. In one instance, a suitable hydrogen storage module can include one or more rechargeable nanostructure or diatom assemblies described herein and implementing some or all of the processes described above. When the hydrogen module is filled with hydrogen, the module can provide a supply of hydrogen to the vehicle. When needed, the vehicle or the module may implement any type of hydrogen release process, for example, by facilitating an appropriate temperature and pressure for the hydrogen to be released from the rechargeable nanostructure or diatom assemblies. When the hydrogen is depleted or nearly depleted from the assemblies, the hydrogen storage module can be replaced with another module that has been pre-filled with hydrogen, or the module can be recharged with hydrogen while the module is mounted to the vehicle.

In another embodiment, a hydrogen storage module can be implemented with a hydrogen-powered device. In one instance, a suitable hydrogen storage module can include one or more rechargeable nanostructure or diatom assemblies described herein and implementing some or all of the processes described above. When the hydrogen module is filled with hydrogen, the module can provide a supply of hydrogen to the device. When needed, the device or the module may implement any type of hydrogen release process, for example, by facilitating an appropriate temperature and pressure for the hydrogen to be released from the rechargeable nanostructure or diatom assemblies. When the hydrogen is depleted or nearly depleted from the assemblies, the hydrogen storage module can be replaced with another module that has been pre-filled with hydrogen, or the module can be recharged with hydrogen while the module is mounted to the device.

OTHER EMBODIMENTS OF THE INVENTION

Some or all of the embodiments described herein can provide changes in some or all of the following aspects over conventional storage technologies.

Weight density, which is defined herein as the total weight of the hydrogen and hydride metal in terms of deliverable energy stored. While the density of hydrogen by volume in a conventional hydride is relatively high, the density by weight can be much lower for nanostructures because of the weight of the associated metal. Conventional hydrides are about four to five times heavier than gasoline because of the weight of the metals. The storage penalty would be still greater except that hydrogen has about three times the energy density of gasoline. Weight can be especially important in the performance of a vehicle, such as an automobile, truck, bus, boat, or any other hydrogen transport system (e.g., distribution of hydrogen storage canisters by common carrier). Nanostructure metals for hydrides can substantially increase the weight density of hydrogen storage while achieving lower overall system weight.

Volume density, which is defined herein as the total volume of hydrogen stored in a volume of hydride with respect to the deliverable energy content. Currently some conventional hydrides can store as much as about half the volume of hydrogen as the equivalent energy of gasoline. While this is up to about twice the amount of hydrogen that can be stored in liquid form, and about three times the hydrogen that can be stored as a gas at approximately 5,000 psi, it nevertheless represents a volume requirement of at least twice that of gasoline. The space and weight requirements can be important in the design of a vehicle such as an automobile or for any hydrogen transport use. Nanostructure materials for hydrides can increase the volume density in at least two ways: (1) by storing a greater percent of hydrogen in the metal owing to the enormous surface area of the nanostructure/metal association; (2) by engineering more volumetrically absorbing metal compounds that can store the hydrogen as a hydride. Optimization of the nanostructures characteristics can be carried out by way of various embodiments.

Materials costs, which are defined herein as the cost to collect, engineer, and produce commercially suitable materials. While manmade nanostructures entail relatively far greater cost to fabricate, naturally occurring nanostructures are biologically reproducible, relatively inexpensive, and a renewable resource that allows a broader range of materials that can be used to form hydrides. Substantial natural geological diatom deposits, called diatomite, occur within the United States (Oregon, Nevada, Washington, Florida, California and New Jersey). These deposits provide readily available and controlled resources. Additionally, diatom cultures can be inexpensively cultivated to provide renewable and reproducible nanostructures according to various embodiments of the invention.

Speed of response, which is defined herein as the speed at which hydrogen gas begins to flow upon reaching the heat of decomposition. The speed of response can be important to the smooth performance of a power vehicle. This and other specific hydride performance characteristics can be optimized via the different characteristics that are abundant in naturally occurring nanostructures according to various embodiments of the invention.

Flow rates, which are defined herein as the rate at which hydrogen discharges from the hydride when the heat of decomposition is applied. The flow rate of the released hydrogen can benefit from the smaller particle sizes of nanostructure particles, since the nanostructures provide relatively more pathways for the exit of the hydrogen gas according to various embodiments of the invention.

Plateau pressure, which is defined herein as the relatively flat region of an S-shaped curve of volume of hydrogen absorbed in the hydride versus pressure (at a constant temperature). This is the region in which most of the hydrogen is absorbed with little pressure change. This S-shaped curve of hydrogen absorption versus pressure, plotted at a constant temperature, is known as an isotherm. At relatively higher temperatures, approximately the same curve shifts higher. Plateau pressure for a given temperature can be engineered in conventional hydrides by the selection of metals, alloys, and intermetallic compounds; with nanostructure materials the plateau pressure can be further tailor-designed by the choice, mixtures, and alloys of materials and can be supplemented with different or similar nanostructure diameters according to various embodiments of the invention.

Plateau slope is defined herein as the slope (usually modestly increasing) of the plateau region of the isotherm. This can be flattened in conventional hydrides with the appropriate activation. It may be possible that many nanostructure hydrides may forego this annealing or activation step according to various embodiments of the invention.

Plateau Pressure-Temperature Relationship is defined herein as the temperature at which an isotherm pressure plateau occurs. The temperatures can be raised or lowered in accordance with the choice of materials in conventional hydrides. Further ranges of flexibility can be obtained with the selection of nanostructure diameters, eliminating or reducing any compromises of other properties according to various embodiments of the invention. These properties can reduce external energy (e.g., waste heat) required for hydrogen desorption from hydrides.

Hysteresis, which is defined herein as the difference in pressure to absorb versus to desorb hydrogen from a hydride. This asymmetry varies between alloys and should be taken into account in designing a system. Dual or multiple bed systems can combine characteristics of specific hydrides for a more economical or efficient overall system. Nanostructure hydrides with their greater combination of diameters and materials can further tailor the design of the hysteresis of a hydride according to various embodiments of the invention.

Ease of activation, which is defined herein as the hydriding of the alloy for the first time. Some alloys can be activated at ambient temperature, while others are more difficult to activate possibly due to a surface barrier that must first be controlled. Nanostructure materials may directly address this problem by affording a broader range of materials for hydrides, and nanostructure diameters, thus providing relatively greater flexibility for dealing with ease of activation according to various embodiments of the invention.

Withstanding poisoning, which is defined herein as withstanding deactivation by impure gas streams; e.g. from air, carbon monoxide, or sulfur dioxide. Different compounds have different degrees of tolerance for such deactivation. Natural occurring nanostructure materials, by providing greater combinations of diameters and materials, can be further tailor-engineer to minimize this problem, boosting the flexibility and performance of the hydride. Certain nanostructures in accordance with embodiments of the invention could be used as scavengers to clean hydrogen or other fuels before or during use in fuel storage, reforming to hydrogen, or in HFCs themselves, to minimize poisoning of hydride-forming materials, catalysts, or electrodes. A mixture of nanoparticles could include hydrides and scavenger. In some instances, a small exchangeable and/or regenerable cartridge of nanostructure material could effectively remove poisons from hydrogen, gasoline, methanol, other fuel, or air. For example, oxygen can be scavenged to increase hydrogen storage levels, and platinum-ruthenium alloy catalyst can be used to prevent poisoning in methanol converters.

Longer cycle life, which is defined herein as the ability to absorb and desorb the same quantity of hydrogen many times with little or no deterioration may be enhanced through the use of nanostructures according to various embodiments of the invention.

Other properties and characteristics, which are taken into account in conventional hydrides, can be further engineered with nanostructure hydrides since there are numerous combinations of diameters and materials to choose from according to various embodiments of the invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for storing hydrogen, comprising:
   providing diatoms comprising diatomaceous earth or diatoms from a predefined culture;
   heating the diatoms in a sealed environment in the presence of at least one of titanium, a transition metal, or a noble metal derived from a titanium, a transition metal, or a noble metal fluoride to provide a porous hydrogen storage medium wherein some or all of the silicon in the diatoms are replaced with the titanium, the transition metal, or the noble metal;
   exposing the porous hydrogen storage medium to hydrogen; and
   storing at least a portion of the hydrogen in the porous hydrogen storage medium.

2. The method of claim 1, wherein the porous hydrogen storage medium comprises at least one of the following: a powder or a solid.

3. The method of claim 1, wherein heating the diatoms in a sealed environment under an inert atmosphere in the presence of at least one of titanium, a transition metal, or a noble metal derived from a titanium, a transition metal, or a noble metal fluoride to provide a porous hydrogen storage medium further comprises the step of fixating to some or all of the silicon in the diatoms at least one of titanium, a transition metal, or a noble metal.

4. The method of claim 1, further comprising:
   releasing at least a portion of the hydrogen from the porous hydrogen storage medium.

5. The method of claim 4, wherein releasing at least a portion of the hydrogen from the porous hydrogen storage medium comprises subjecting the porous hydrogen storage medium to a predefined temperature and pressure.

6. The method of claim 5, further comprising:
   re-exposing the porous hydrogen storage medium to hydrogen; and
   storing at least a portion of the hydrogen in the porous hydrogen storage medium.

7. The method of claim 1, wherein the at least one of titanium, a transition metal, or a noble metal is a transition metal derived from a transition metal fluoride.

8. The method of claim 1, wherein the at least one of titanium, a transition metal, or a noble metal is a noble metal derived from a noble metal fluoride.

9. The method of claim 1, wherein the at least one of titanium, a transition metal, or a noble metal is titanium derived from titanium fluoride.

10. The method of claim 1, wherein the at least one of titanium, a transition metal, or a noble metal is titanium fluoride, and about 5% to about 100% of the silicon in the diatoms are replaced with the titanium.

11. The method of claim 1, wherein the step of heating the diatoms is carried out from about 250° C. to about 350° C.

12. The method of claim 1, wherein the step of heating the diatoms in a sealed environment in the presence of at least one of titanium, a transition metal, or a noble metal to provide a porous hydrogen storage medium wherein some or all of the silicon in the diatoms are replaced with the titanium, the transition metal, or the noble metal is carried out under conditions wherein the original nanopore-type structure of some or all of the diatoms remains intact.

* * * * *